March 24, 1970  J. C. OLIVER  3,502,367
TAILGATE CONSTRUCTION
Filed June 27, 1968  2 Sheets-Sheet 1
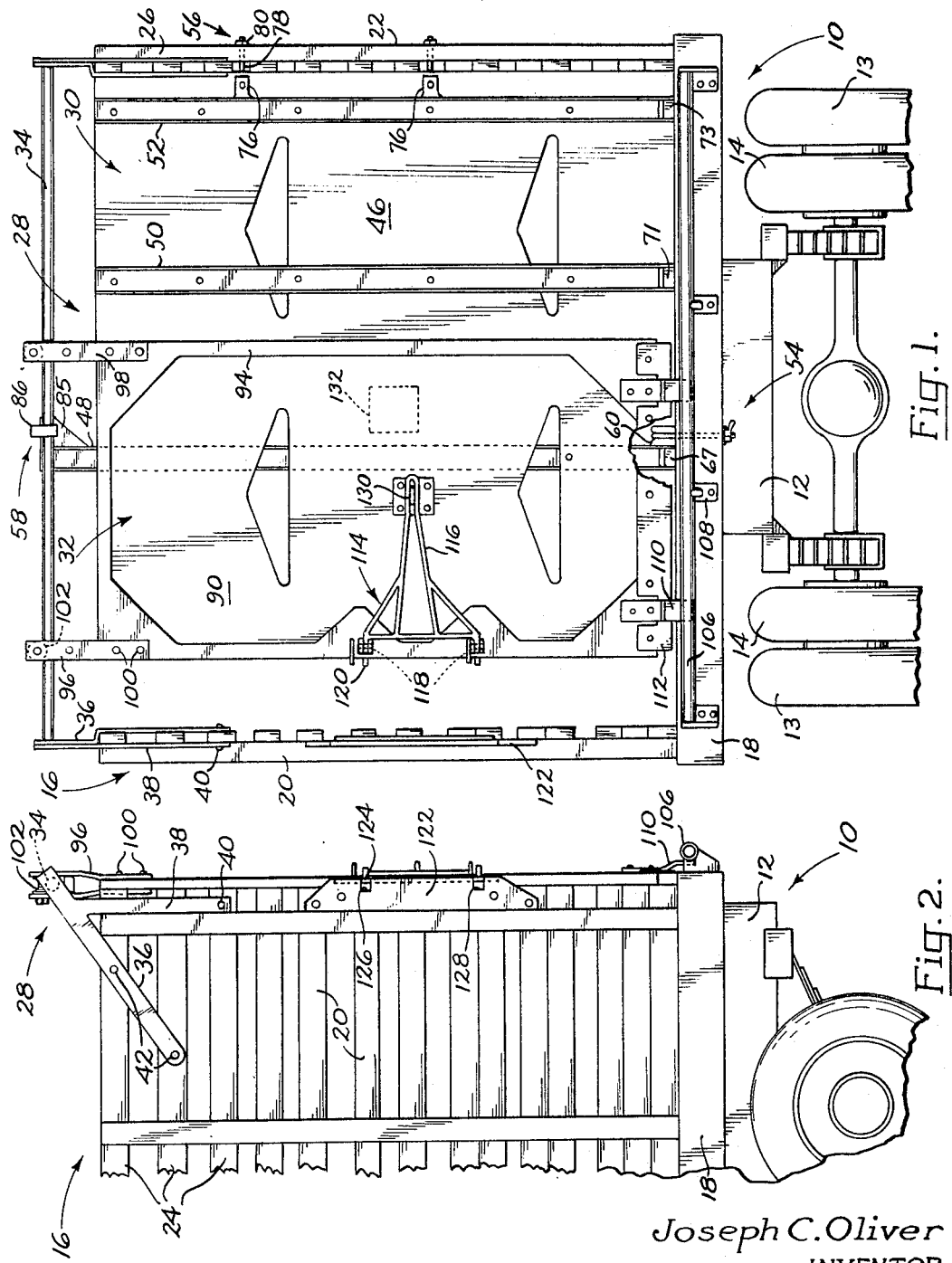
Joseph C. Oliver
INVENTOR
BY
Kolisch + Hartwell
Attys.

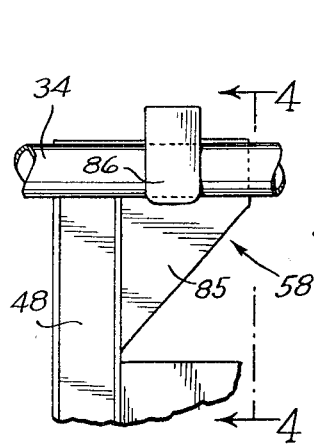
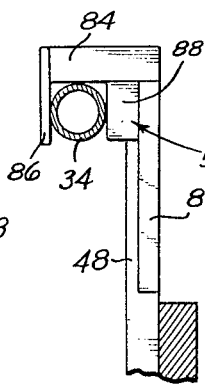
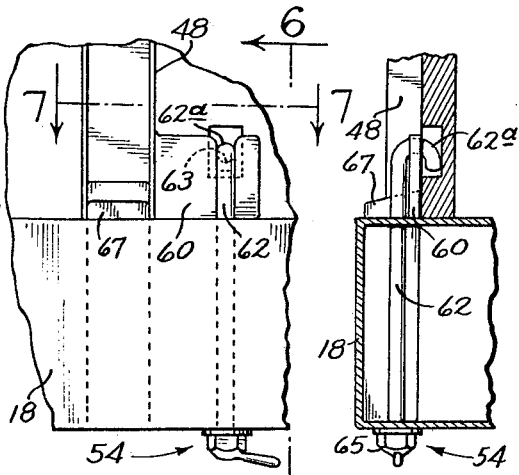
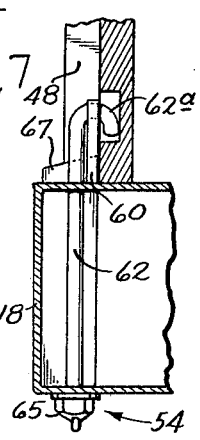
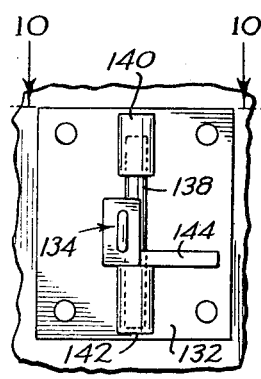
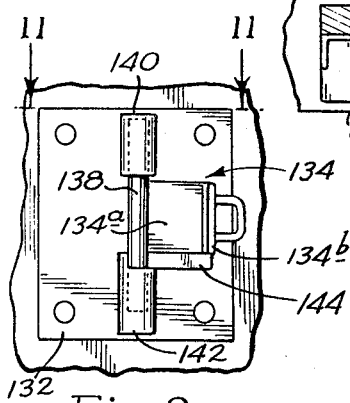
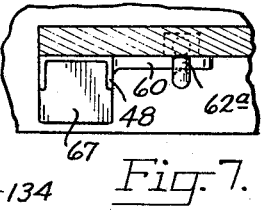
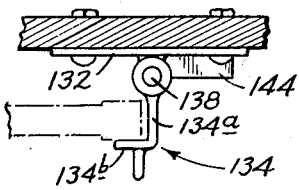
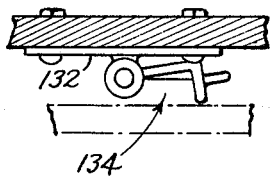
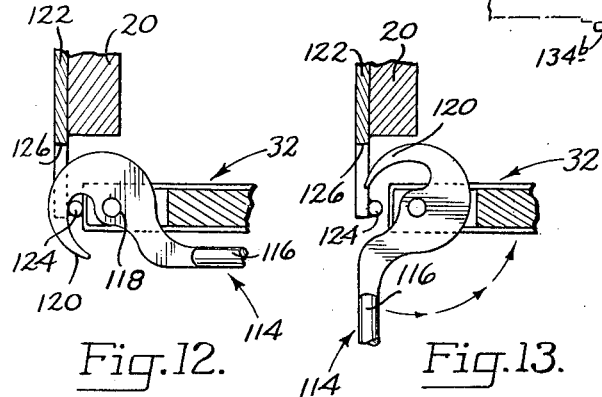
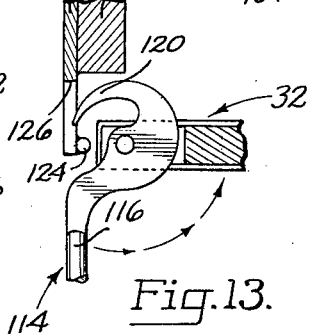

United States Patent Office 3,502,367
Patented Mar. 24, 1970

3,502,367
TAILGATE CONSTRUCTION
Joseph C. Oliver, John Day, Oreg. 97845
Filed June 27, 1968, Ser. No. 740,673
Int. Cl. B62d *33/04, 25/00*
U.S. Cl. 296—50                                         9 Claims

ABSTRACT OF THE DISCLOSURE

A tailgate construction for closing off the opening framed at the rear of a truck body by its bed and opposed sides, including an elongated elevated bar spanning the sides of the truck body supporting a shiftable panel section for closing off one side of the opening. A fixed panel section secured to the bed of the truck body and its opposite side, and supported by the bar, closes off the other side of the opening. The bar and fixed panel section are removable. The shiftable panel section may be detachably locked at each of its opposed side margins, to a side of the truck and to the fixed panel section, respectively.

---

This invention relates to a tailgate construction for closing off the opening framed at the rear of a truck body by its bed and opposed sides.

The tailgate construction is characterized by a number of novel features including the fact that it may readily be removed from the truck, further to facilitate other uses of the truck. The tailgate when installed, nevertheless, providing a rugged closure for the rear end opening in the truck body, rigidly uniting the sides and bed of the truck. The tailgate construction includes a fixed panel section closing off one side of the rear opening of the truck body, and a shiftable panel section for closing off the opposite side of such opening. Also present is means whereby the shiftable panel section may be locked securely along opposite side margins to a side of the truck and to the fixed panel section, respectively, with the entire assembly then forming a secure barrier at the rear of the truck body.

Although it is not intended to be limited to any specific use of the tailgate construction, it has particular utility for ranchers who desire to convert a conventional truck into one suitable for transporting livestock. The pressure of livestock within a loaded truck, and the shifting which may occur in such a load with movement of the truck, make it essential that any tailgate construction employed be sturdy and ruggedly supported. There is the additional requirement, of course, that the tailgate construction permit stock to be moved easily into and out of the truck. Preferably with the tailgate installed, enough clearance should be present to permit the handling of tall loads such as saddle horses, hay or machinery. To permit a rancher to utilize the truck in other capacities, the tailgate should be removable to an extent permitting complete opening up of the rear of the truck. The tailgate construction contemplated by this invention permits the attainment of all of these ends.

Other objects and advantages of the invention will become more fully apparent as the following description is read in conjunction with the accompanying drawings, wherein:

FIG. 1 is an end elevation, viewing the rear end of the truck, and showing a tailgate construction as contemplated by a specific embodiment of the invention;

FIG. 2 is a side elevation of rear portions of the truck shown in FIG. 1;

FIG. 3 is a view, somewhat enlarged, showing details of how an elongated elevated bar which spans the side of the truck provides support for the inner side margin of a fixed panel section in the tailgate construction;

FIG. 4 is a cross-sectional view, taken generally along the line 4—4 in FIG. 3;

FIG. 5 is a view on substantially the same scale as FIGS. 3 and 4, illustrating means employed for anchoring the fixed panel section in the tailgate construction to the bed of the truck body;

FIG. 6 is a cross-sectional view, taken generally along the line 6—6 in FIG. 5;

FIG. 7 is a cross-sectional view, taken generally along the line 7—7 in FIG. 5;

FIGS. 8 and 9 are side elevation views, drawn on substantially the scale of FIG. 3, showing details of a keeper employed in locking a side margin of a shiftable panel section to a side margin of a fixed panel section;

FIGS. 10 and 11 are cross-sectional views, taken generally along the lines 10—10 and 11—11 in FIGS. 8 and 9, respectively; and FIGS. 12 and 13 are drawings on approximately the scale of FIG. 3, illustrating details of a latch mechanism provided for locking a side margin of the shiftable panel section to a side of the truck body.

Referring now to the drawings, and first of all more particularly to FIGS. 1 and 2, the rear end of a truck is shown generally at 10, such including a frame 12 and paired wheels 13, 14 providing support for opposite sides of the truck. A truck body 16 is mounted over the top of truck frame 12, and such includes a bed 18 and opposed sides 20, 22. In the particular truck shown the sides are formed by boards 24 secured to stakes 26 extending downwardly into the usual stake holes provided along opposite margins of bed 18.

The tailgate construction in FIGS. 1 and 2 has been given generally the reference numeral 28, and includes what is referred to herein as a pair of panel sections 30, 32, one of which (panel section 30 in the drawings) is fixed in place to close off one side of the opening framed by bed 18 and truck body sides 20, 22 at the rear of the truck. The other panel section (panel section 32 in the drawings) is a shiftable panel section, and is positionable to close off the other side of the opening framed at the rear of the truck. Also part of the tailgate construction is an elevated bar or rail 34 which spans the truck body sides and provides support for the two panel sections, as will be more fully described.

Considering first of all bar 34 and details of its mounting, each end of the bar is detachably mounted on one of the sides of the truck body through a bracket structure such as that indicated at 36. Such includes an upright leg 38 which may be detachably fastened to a board in the truck body side as by detachable fastener 40, and an inclined leg 42 joined to the upright leg detachably fastened in place by detachable fastener 42. An end of bar 34 is suitably joined to the upper extremity of leg 42 thus preferably to be positioned slightly to the rear of the rear edge of the side of the truck body.

Fixed panel section 30 may include means such as panel 46 forming a wall in the panel section which is strengthened by elongated strengtheners in the form of channel sections shown at 48, 50 and 52 which are secured to the rear face of panel 46.

The fixed panel section is secured in place closing off the right side of the rear opening in the truck body in FIG. 1 by means 54 anchoring the base of the section to the bed of the truck body and means 56 detachably anchoring the side margin of the panel section to side 22 of the truck body. Further, a means 58 is provided whereby bar 34 provides support for the upper left margin of the panel section FIG. 1.

Considering specifically means 54 anchoring the base of the section to the bed 18, as illustrated in FIG. 1, where the lower portion of the slidable panel section has been broken away, and as perhaps best illustrated in FIGS. 5, 6 and 7, fastened to the side of channel section 48 as by welding is a lug 60 which projects laterally of the channel section. A hook bolt 62 including a hook portion 62a fitting within a notch 63 formed in lug 60 is employed to secure the lug against the bed of the truck. The hook bolt extends downwardly through an accommodating passage provided in the bed of the truck and nut and washer assembly 65 are mounted on the base of the hook bolt. The bolt and assembly 65 together constitute detachable fastener means anchoring the base of the section in place. A wooden block 67 may be snugly fitted into stake hole 69 with such abutting channel section 48 to provide further support for the base of the fixed section. Similar blocks 71, 73 passed through stake holes in front of channel sections 50, 52 serve to support the base of the fixed channel section at points spaced toward side 22 of the truck in FIG. 1.

With respect to means 56 anchoring the side margin of panel sections 30 to side 22, channel section 52 includes lugs 76 welded to the side thereof projecting laterally to the right of the channel section in FIG. 1. Hook bolts 78 welded to these lugs extend through bores in one of the stakes 26 forming side 22, and nuts 80 are screwed onto the ends of these hook bolts.

Considering means 58, it will be noted that channel section 48 extends upwardly beyond the top of panel 46 to form a post portion at the top of the panel section. As can be seen in FIG. 1, and with further reference to FIGS. 3 and 4, a hook is formed at the top of this channel section by pieces 84, 86 which are welded to a gusset 85 fastened to the channel section and this hook fits over bar 34. A shoe portion 88 is fastened within the hook to gusset 85 in a position directly in front of the bar, whereby a snug fit is produced.

In the organization, shiftable section 32 is mounted somewhat rearwardly of fixed section 30, to permit the shiftable section when moved to move in a path located behind the fixed panel section. This contributes to ease in manipulating the shiftable panel section, and also means that when the panel section is moved to open up the rear of the truck, any livestock within the truck will not hamper opening movement of the panel section. Bar 34 extends across the rear of channel section 48, and thus is in a position to provide support for the shiftable panel section with such depending directly down from the bar.

Considering now details of the shiftable panel section, it also may comprise a panel, such as the one shown at 90, strengthened along margins, as by strengtheners 92, 94. Hangers 96, 98 fastened as by nut and bolt assemblies 100 to upper extremities of strengtheners 92, 94, and including rollers 102, dependently support the shiftable section from bar 34. The hangers permit the door to be moved from a position closing off the left side of the rear opening of the truck body in FIG. 1, transversely of the truck bed, to a position more nearly overlapping the fixed panel section. With removal of rollers 102, the hangers may be removed from bar 34.

To guide the base of the shiftable panel section, a pipe or rail 106 is included mounted through brackets 108 in a position extending along the rear of the truck bed. The pipe is spaced slightly from the rear of the truck bed, and guide plates 110 fastened to the shiftable section adjacent its base extend downwardly into the space between the pipe and the rear of the truck bed.

Shown at 112 is a splash guard, which may be made of canvas, rubber or other flexible material.

According to this invention, the shiftable panel section, when in a position completely closing off the rear of the truck body, is locked adjacent one margin to side 20 of the truck body and adjacent its opposite margin to the adjacent margin of the fixed panel section.

Further explaining this construciton, and referring to FIGS. 1 and 2 in conjunction with FIGS. 12 and 13, a latch is shown at 114 including a handle portion 116. The latch is hinged at 118 whereby it is swingable about an upright axis. Latch fingers 120 are presented at the left extremities of the latch and adjacent hinge connection 118 in FIG. 1.

Latch plate 122 is secured to side 20 of the truck body, and this plate mounts a fixed pin 124 which extends across cut out regions 126, 128 in the latch plate. With the latch swung outwardly so that the latch handle projects toward the viewer in FIG. 1 (downwardly in FIG. 13), the latch fingers move away from pin 124 to release the latch mechanism and permit opening of the shiftable panel section. With the latch swung so that the handle is flush with panel 90 of the panel section, the latch fingers swing outwardly and then rearwardly to move around pin 124, as best shown in FIG. 12. In this condition the latch operates rigidly to secure the side margin of the shiftable panel section to slide 20 of the truck body. A padlock or other securing device may be secured over bail 130 to hold the latch in its locked position.

Shown in dotted outline at 132 in FIG. 1 is a keeper mounting plate, which is pictured in greater detail in FIGS. 8, 9, 10 and 11. Referring to these figures, the plate supports a keeper 134 in the form of an angle piece having flanges 134a, 134b. A hand 136 is joined to outer flange 134b in such angle piece. Flange 134a in the keeper is joined as by welding to a pin 138 which projects above and below the keeper. This pin has ends slidably received within sockets 140, 142 secured to the keeper plate. Shown at 144 is a shelf joined to the keeper plate, on which the keeper rests when swung to the position shown in FIGS. 9 and 11. The shelf terminates directly adjacent the right side of pin 138 in FIGS. 8 and 9, and as a consequence with the keeper swung to the position shown in FIGS. 8 and 10, where it projects rearwardly of the fixed panel section, it drops against socket 142 afterward to be held from pivotal movement by the edge of the shelf.

With the shiftable panel section closing off the left of the opening at the rear of the truck body, the right side margin of the shiftable section may be locked to the fixed panel section by swinging the keeper to the position of FIGS. 8 and 10. With the keeper so positioned, the movable panel section is prevented from moving open by shifting to the right in FIG. 1. Further, it is prevented at its midregion from moving rearwardly of the rear face of the fixed panel section. In this way the shiftable panel section is well braced to withstand the pressures exerted by a full load of livestock within the truck body.

The operation of the tailgate construction should be obvious. For loading and unloading purposes, the shiftable section is moved to a position toward the right of the truck body in FIG. 1, which opens up the rear of the truck body between side 20 and the left side margin of the fixed panel section. Opening and closing is performed easily by a man outside the truck, and opening is not hampered by the presence of a load within the truck. With the movable section closing the rear of the truck and latched in place, it is held adjacent both of its side margins.

Elevated bar 34 and the fixed panel section together add rigidity to the truck body at the rear of the truck. With the movable section latched to side 20, the movable section also contributes to rigidity.

The tailgate is easy to operate in all types of weather conditions. The clearance provided by the elevated bar is adequate to permit the loading and unloading of loads of considerable height. It is an easy matter, if desired, to remove the two panel sections thus to further open up the rear of the truck body. If desired, bar 34 may also be removed, to make the truck into a conventional one having stake supported sides only.

While there has been described a preferred embodiment of the invention, obviously modifications and variations are possible. It is intended to cover all such modifications and variations as would be apparent to one skilled in the art, and that come within the scope of the invention.

It is claimed and desired to secure by Letters Patent:

1. In a truck having a truck body, including a truck bed and opposed sides framing an opening at the rear of the truck, a tailgate construction for closing off said opening comprising an elongated elevated bar extending over said opening, spanning the sides of the truck body, and having ends mounted on said opposed sides; an upright fixed panel section bounded by opposed side margins, adjacent one of the truck body's sides, for closing off one side of said opening, said fixed panel section being secured at its base to the truck bed and along one of its opposed side margins to one of the sides of the truck body and being supported at its top by said bar; an upright shiftable panel section adjacent the other of the truck body's sides for closing off the other side of said opening, said shiftable panel section including hanger means suspending the panel section from said bar and accommodating movement of the panel section in a path extending transversely of the truck bed; first locking means for securing one of the side margins of the shiftable panel section to said other of the truck body's sides; and second locking means for securing the other side margin of the shiftable panel section to a side margin of the fixed panel section.

2. The truck of claim 1, wherein the fixed panel section is supported by said elevated bar through a post portion joined to the fixed panel section which extends upwardly from the section from adjacent the other of its opposed side margins, said post portion being supported by a midregion of the bar with the bar extending across the rear of the post portion.

3. The truck of claim 2, wherein the fixed panel section is secured to the truck bed by fastener means anchoring the panel section to the bed at a point disposed under said post portion and adjacent said other side margin of the fixed panel section.

4. The truck of claim 1, wherein the fixed panel section is located forwardly on the truck body from the shiftable panel section, and said second locking means comprises a keeper having an operative locking condition where it extends rearwardly from the fixed panel section to establish a connection between the fixed section and the shiftable section rigidly holding the latter from movement rearwardly of the fixed panel section.

5. The truck of claim 4, wherein the keeper is mounted on the fixed panel section and is swingable to an inoperative position out of the way of the shiftable panel section when the latter is moved in its said path.

6. The truck of claim 4, wherein the first locking means comprises a latch having an operative locking condition where it extends between said other of the truck body's sides and said one side margin of the shiftable panel section to establish a connection rigidly holding the shiftable panel section against said other of the truck body's sides.

7. The truck of claim 1, wherein each end of said bar is mounted on a side of the truck body through a detachable bracket structure fastened to the side of the truck body.

8. The truck of claim 7, wherein the fixed panel section is supported by said elevated bar through a post portion joined to the fixed panel section extending upwardly from the section from adjacent the other of its opposed side margins, said post portion having means engaging a midregion of the bar with the bar extending across the rear of the post portion.

9. The truck of claim 8, wherein said means engaging the midregion of the bar is detachable from the bar, and the fixed panel section is secured along its said one of its opposed side margins to said one side of the truck body through detachable fastener means, and is secured at its base to the truck bed by detachable fastener means.

References Cited

UNITED STATES PATENTS

| | | | |
|---|---|---|---|
| 1,864,660 | 6/1932 | Miller | 296—51 |
| 2,797,959 | 7/1957 | Brice | 296—50 |

LEO FRIAGLIA, Primary Examiner

JOHN A. PEKAR, Assistant Examiner